July 31, 1956　　F. J. SCHENKELBERGER　　2,756,850
DRIVE MECHANISM
Filed April 11, 1952　　6 Sheets-Sheet 1

FIG. 1

INVENTOR.
FRANK J. SCHENKELBERGER
BY Geo. B. Pitts
ATTORNEY

July 31, 1956     F. J. SCHENKELBERGER     2,756,850
DRIVE MECHANISM Filed April 11, 1952     6 Sheets-Sheet 3

INVENTOR.
FRANK J. SCHENKELBERGER
BY
*Geo. B. Pitte*
ATTORNEY

July 31, 1956  F. J. SCHENKELBERGER  2,756,850
DRIVE MECHANISM
Filed April 11, 1952  6 Sheets-Sheet 4

FIG. 6

INVENTOR.
FRANK J. SCHENKELBERGER
BY
Geo. B. Pitts
ATTORNEY

FIG. 7

INVENTOR.
FRANK J. SHENKELBERGER
BY
Geo. B. Pitts
ATTORNEY

July 31, 1956  F. J. SCHENKELBERGER  2,756,850
DRIVE MECHANISM
Filed April 11, 1952  6 Sheets-Sheet 6

INVENTOR.
FRANK J. SCHENKELBERGER
BY
Geo. B. Pitts
ATTORNEY

United States Patent Office 2,756,850
Patented July 31, 1956

2,756,850

DRIVE MECHANISM

Frank J. Schenkelberger, North Olmsted, Ohio, assignor, by mesne assignments, to The Baker-Raulang Company, a corporation of Delaware Application April 11, 1952, Serial No. 281,833

17 Claims. (Cl. 192—.02)

This invention relates to a mechanism for driving a member or members. For exemplification it is shown as applied to the driving of the traction wheels of a vehicle, the invention being particularly applicable to trucks and busses. The truck herein shown is of the load elevating type. The invention includes a source of power, which through a fluid operating unit, drives a wheel or a pair of wheels for the truck. As shown herein, the prime motive power may consist of an electric motor or an internal combustion engine. The source of power may also be employed to operate a pump in a fluid pressure system for operating one or more fluid operated mechanisms mounted on the truck, the mechanism herein chosen for illustration comprising cylinder-piston elements for raising the elevating member for the load carrier. In trucks of the type referred to, rapid manipulation of the truck forwardly and backwardly often takes place while picking up or discharging a load, especially when stacking and destacking loads in freight cars, cargo planes and storage areas. Such manipulation imparts jerks and stresses to the driving mechanism as well as the load being handled.

One object of the invention is to provide an improved drive mechanism for a vehicle of simplified construction, providing for ready assembly and the elimination of power transmissions, electric devices such as controllers, resistances and wiring for these devices; and where an internal combustion engine is employed the clutch is also eliminated.

Another object of the invention is to provide an improved vehicle drive mechanism consisting of a relatively few operating units, whereby economical construction and upkeep results.

Another object of the invention is to provide, in trucks of the type referred to, a compact assembly and a minimum overall length thereof, whereby truck travel in lanes having sharp angled connections as well as loading, discharging and U-turns or turn-around operations in limited areas are facilitated.

Another object of the invention is to provide an improved vehicle drive mechanism, which insures smooth driving and braking operations, ready control in starting, uniform acceleration, uniform de-acceleration and stopping, and stepless acceleration to maximum speed.

Another object of the invention is to provide an improved automotive vehicle having a fluid controlled unit in the driving connections for the vehicle traction wheels and a fluid operated mechanism, wherein a single source of power is employed for the driving connections and generating fluid pressure for the mechanism.

A further object of the invention is to provide an improved driving mechanism for a vehicle having a fluid operating unit operable automatically to control the speed of the vehicle.

A still further object of the invention is to provide an improved vehicle drive mechanism employing a fluid coupling unit so constructed and arranged that when transmitting high torque at low vehicle speeds bucking effects are avoided.

Other objects of the invention will be apparent to those skilled in the art to which my invention relates from the following description taken in connection with the accompanying drawings, wherein:

Figs. 1 and 1a, taken together, show a drive mechanism embodying my invention;

Figs. 2 and 2a are sections on the lines 2—2 and 2a—2a, respectively, of Fig. 1a;

Fig. 2b is a sectional view (similar to Fig. 2) showing a modified form of fluid controlled unit;

Figs. 3 and 4 are sections on the lines 3—3 and 4—4, respectively, of Fig. 1a;

Figure 1:
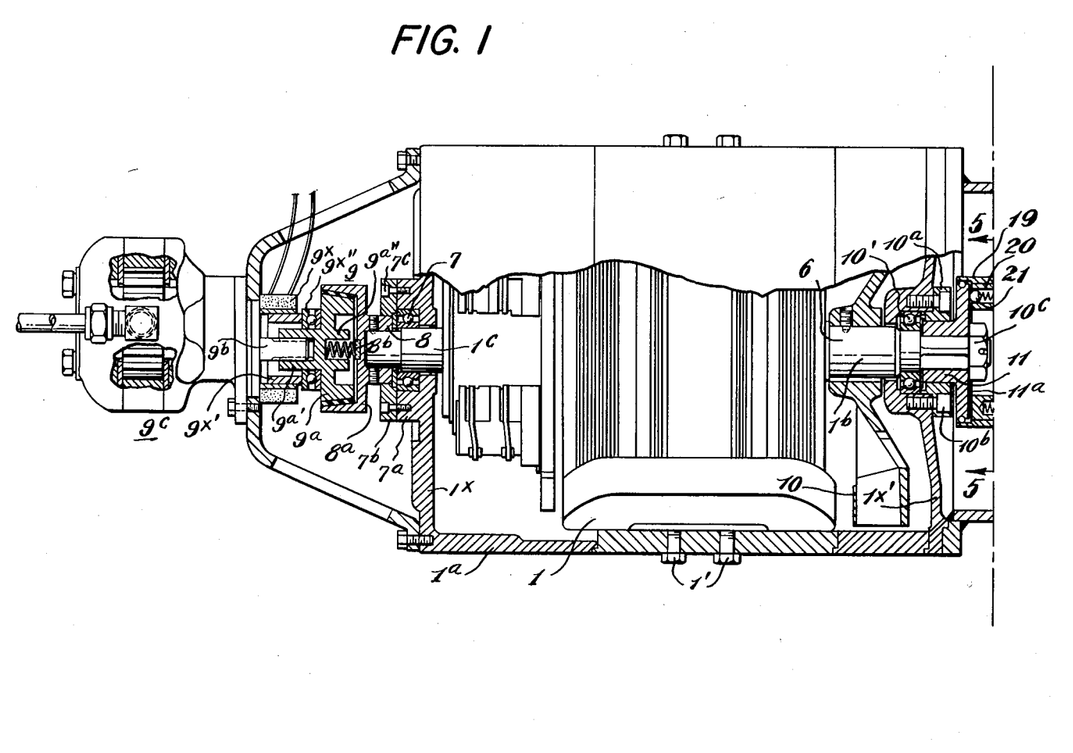
Figure 6:
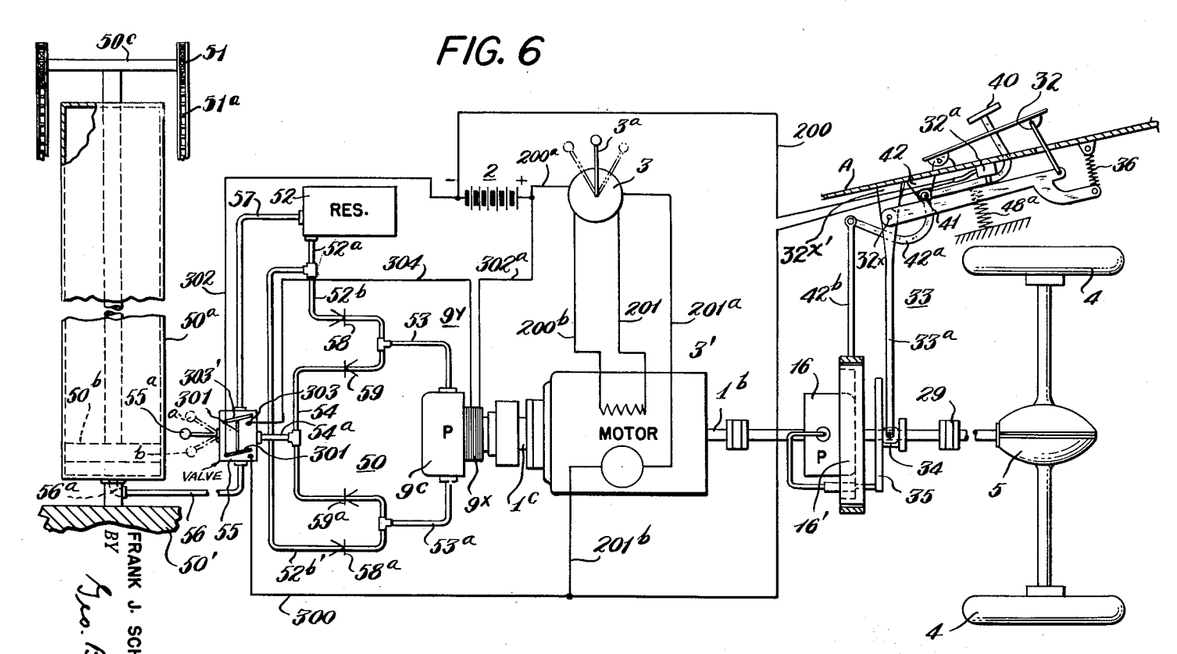
Fig. 6 is a diagrammatic view, parts being shown in plan, parts being shown in elevation and parts being broken away.

In the drawings, referring particularly to Figs. 1 to 6, inclusive, 1 indicates as an entirety a prime motive power, which in the form of construction referred to consists of an electric motor supplied with current from a suitable source 2 (see Fig. 6). The direction of rotation of the motor shaft is controlled by a suitable electric switch actuated by movement of a lever 3a relative to its neutral position as shown in dotted lines. The motor 1 and certain parts connected to its shaft, as later referred to, are enclosed in a sectional housing 1a which is mounted on the vehicle chassis in any desired manner, the motor 1 being secured to one section of the housing 1a by screws 1'. In industrial trucks, dependent on various factors, the front wheels of the trucks are driven or, as herein shown, the rear wheels 4 are driven. The wheels 4 are connected to axles, which in turn are connected to a differential mechanism in a housing 5, the main gear 5a of the differential mechanism being shown in mesh with a worm 5b fixed to the propeller shaft 5c which is driven in the manner hereinafter set forth. Accordingly, in the present disclosure, the motor shaft 6, which is drivingly connected to the wheels 4, as later set forth, extends rearwardly, as shown at 1b (Figs. 1 and 6). For purposes later set forth the motor shaft 6 is provided with a forward extension, as shown at 1c. The shaft extension 1c is mounted in suitable anti-friction bearings 7 seated in a collar 7a provided on the adjacent transverse wall 1x of the housing 1a, the outer race of the bearings 7 being held in place by an annulus 7b, which is suitably, removably secured to the end wall of the collar 7a by screws 7c. The shaft extension 1c outwardly of the bearings 7 extends through and is secured by set screws to a collar 8, which engages the inner race of the bearings 7. The outer end of the collar 8 is provided with a disk 8a which is suitably recessed to form one element of a clutch 9, arranged to be engaged by a movable clutch element 9a. The clutch element 9a, as later set forth, is drivingly connected to the adjacent end portion of the shaft 9b of a pump, indicated as an entirety at 9c, later referred to.

While the shaft extension 1c may be connected to the shaft 9b to drive the latter continuously, I preferably provide an electrically operated clutch including the elements 9, 9a operable automatically, upon operation of a valve, as later referred to, to drivingly connect the shaft extension 1c to the shaft 9b. In addition to the elements 9, 9a, the clutch 20 comprises a collar 9a' on the outer face of clutch element 9a which collar is slidably keyed or splined to the adjacent end portion of the shaft 9b, whereby the latter is driven when the clutch elements are in engagement. The inner face of the clutch element 9a is provided with a pocket 9a" in which an expansion spring 8b is seated and disposed between the bottom of the pocket and the clutch member 8a, the spring serving to bias the clutch element 9a outwardly and slide it endwise on the shaft 9b, to effect its disengagement from the clutch element 8a. Surrounding the collar 9a' and suitably fixed to the end wall of the housing 1a is a solenoid coil 9x having an annular core 9x', the latter in turn having on its outer end the inner race for a thrust bearing 9x" the outer race of which engages the clutch element 9a to rotate therewith. The clutch element 9a is operated toward the right, as viewed in Fig. 1, into engagement with the clutch element 9a upon energization of the coil 9x, when the circuit connected thereto is closed, as later set forth.

The shaft extension 1b extends through and is keyed to the hub of a fan 10 the operation of which maintains a circulation of air in and through the housing to eliminate heat. Beyond the fan the shaft extension 1b is mounted in suitable anti-friction bearings 10' seated in a recess formed in a transverse wall 1x' (which wall is removably mounted between adjacent sections of the housings 1a). The outer race of the bearings 10' is held in place by an annulus 10a, which is suitably, removably secured to the wall 1x' by screws 10b. The shaft extension wall 1b outwardly of the bearings 10' extends through and is splined to a collar 11 on the inner face of a disk 11a, which forms one element of a coupling 12. The coupling element 11a is connected to another coupling element 13 (Fig. 1a) of the coupling 12, the element 13 comprising a disk 13a having on its outer face a collar 13b, the inner splined wall of which accommodates the adjacent splined end portion of a shaft 14. The outer end of the shaft extension 1b is provided with a nut 10c, which is tightened against the disk 11a to secure the inner race of the bearing 10' in engagement with a shoulder on the shaft extension 1b. The adjacent end of the shaft 14 is provided with a nut 14a which engages the disk 13a to secure the coupling element 13 against a shoulder 14' on the shaft 14.

Figures 1A, 2A:
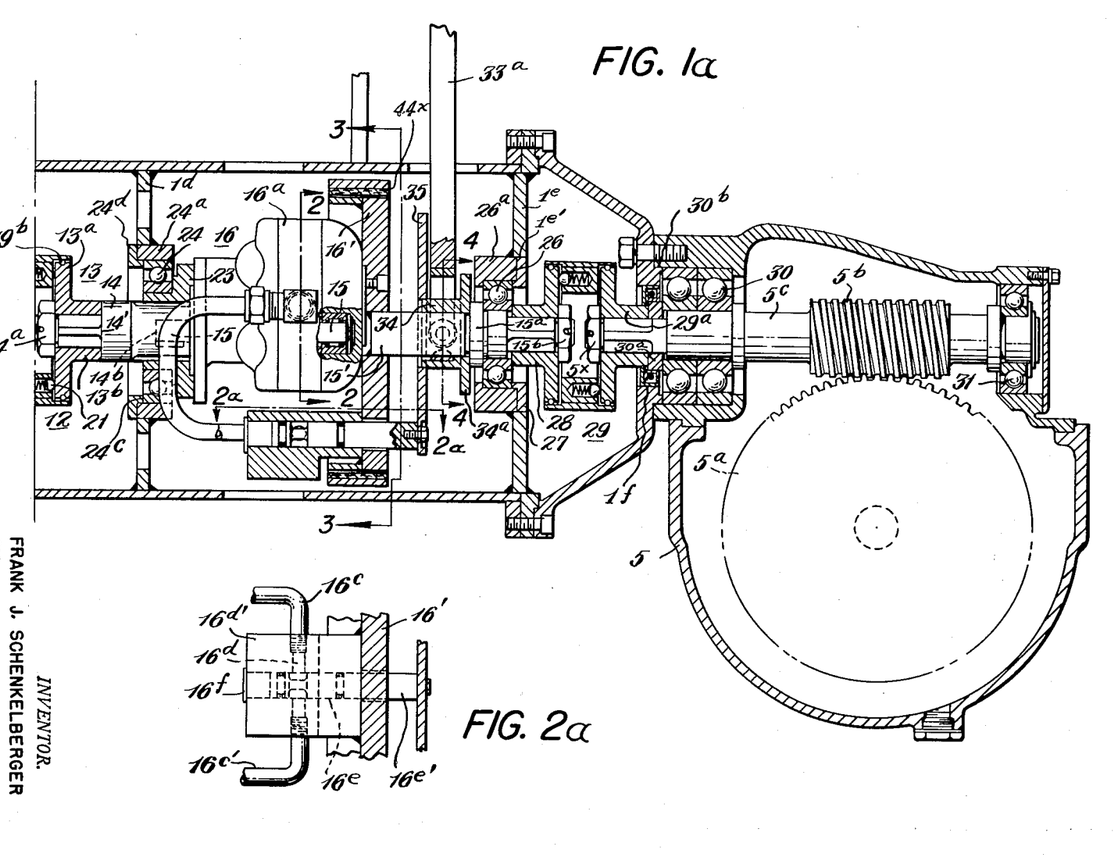

The opposite end of the shaft 14 is axially recessed inwardly, as shown at 14b, which recess receives and supports the adjacent end portion of the main shaft 15 of a fluid controlled rotatable driving unit, indicated as an entirety at 16, having a casing 16a to which is secured a disk 16' for a purpose later set forth. As shown in Fig. 1a, the shaft 15 is suitably keyed to the side wall of the recess 14b. The disks 11a, 13a, are connected in non-rotative relation so as to provide a driving connection from the shaft 6 to the shaft 14.

The connection between the elements 11 and 13 of the coupling comprise an annulus 17 (see Fig. 5) disposed between the disks 11a and 13a. One side of the annulus 17 is formed with diametrically related recesses 17a which accommodate complementary shaped lugs 17b provided on the adjacent disk. The opposite side of the annulus 17 is formed with diametrically related recesses 18 which accommodate lugs 18a on the adjacent disk, each lug 18a preferably being disposed 90 degrees from and between the lugs 17b. A circular band 19 surrounds the peripheries of the disks 11a, 13a, and encloses the space therebetween, the band being secured to the annulus 17 by a set screw 19a. A suitable seal ring 19b formed of rubber or other yieldable material is provided between the band 19 and the periphery of each disk 11a, 13a. The opposite faces of the annulus 17 have inwardly extending pockets 20 formed therein, two pockets in diametrical relation being shown. Each pocket 20 contains a device or ball 21 biased outwardly into engagement with the adjacent coupling disk by a spring 21a interposed between it and the bottom of the pocket. The outer end of each device 21 is preferably of spherical shape, whereas its inner end may be flat to form a seat for the outer end of the spring 21a if so desired. As the respective parts of the non-rotative connections 17a—17b, 18—18a, for the coupling 12 have a loose or limited engaging relation, to provide a flexible joint or coupling, the biased devices 21 co-operate to prevent vibration of the annulus 17 and noise incident thereto.

The casing 16a of the fluid controlled unit 16, consists of a plurality of sections connected together by bolts 16x and forming therewithin a chamber 16a' (see Fig. 2), the latter having intermediate its opposite end walls diametrically related fluid flow openings 16b, 16b', to which are connected the corresponding ends of conduit sections 16c, 16c', respectively. The opposite ends of the conduit sections 16c, 16c', are respectively connected to the opposite ends of a through opening 16d (see Fig. 2a) formed in a valve casing 16d', which is suitably fixed at one end to the disk 16'. The valve casing 16d' is formed with an elongated recess 16e to accommodate a valve element 16e' slidable therein and operated endwise in the manner later set forth. The recess 16e preferably extends through the valve casing 16d' and closed by a removable plug 16f. From the foregoing description it will be observed that the chamber 16a', conduit sections 16c, 16c' and opening 16d provide a closed circuit for the fluid and that the fluid flow therein is dependent on the operation of the valve element 16e' from open to closed position.

Figure 2:
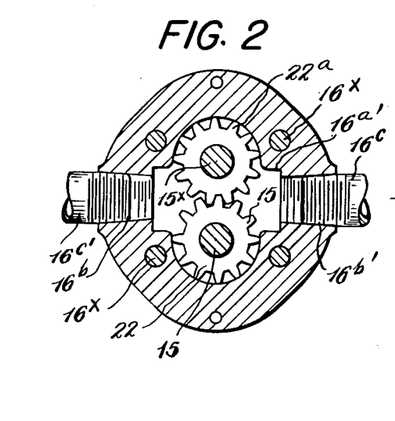
Figure 2A:
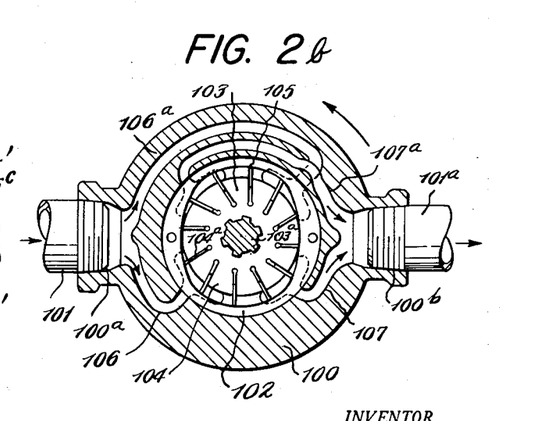

As shown in Fig. 2, the diametrical inner portions of the walls of the chamber 16a', between the openings 16b, 16b', are relieved and provided with arcuate surfaces having close clearances with the teeth of rotatable impeller elements 22, 22a. The teeth are in meshing relation for a purpose later set forth. The element 22 is fixed to the shaft 15, the opposite or outer end of which is rotatably supported in suitable bearings mounted in the outer end wall of the casing 16a, in axial relation to a shaft 15', whereas the element 22a is fixed to a companion shaft 15x, the opposite ends of which shafts are suitably mounted in suitable bearings supported in the end walls of the casing 16a. The inner end wall of the casing 16a, the left hand wall as viewed in Fig. 1a, is provided with an annular member 23 the side wall of which is cut away to form a seat for the inner race of anti-friction bearings 24. The outer race of the bearings 24 is seated in a collar 24a fixed in an opening formed in a transverse wall 1d within and suitably fixed to the housing 1a. A ring 24d is provided with a flange 24c, which has a pressed-in fit in the collar 24a forming a seat for the outer race of the bearings 24.

The inner end of the shaft 15' preferably extends into and is welded to the walls of an opening formed in the disk 16', which serves as one element of a brake 25 (later referred to) for the vehicle. Intermediate its opposite ends the shaft 15' is provided with a collar 15a to form a seat for the inner race of suitable anti-friction bearings 26, the outer race for the bearings being seated in an annular member 26a suitably fixed to a transverse wall 1e in concentric relation to an opening 1e' formed therein. A ring 27 is provided for engaging the outer race of the bearings 23 and has a flange which is pressed in the opening 1e', whereby the race is held in the seating member 26a. From the foregoing description it will be observed that the controlling unit 16 is rotatably supported by the bearings 24, 26, for rotation in either direction, dependent upon the direction of rotation of the motor shaft 6.

As shown in Fig. 1a, the shaft 15' extends outwardly of the bearing 26 and extends through and is splined to the collar 28 forming part of the inner element of a coupling 29. The outer end of the shaft 15' is provided with a nut 15b, which through the adjacent inner coupling element secures the inner race of the bearings 26 in engagement with a collar 15a on the shaft 15'. The coupling 29 is preferably similar in construction to the coupling 12 and a collar 29a on the outer element of the coupling 29 is provided with internal splines complementary to external splines on the inner end of the propeller shaft 5c.

The opposite end portions of the propeller shaft 5c are suitably mounted in anti-friction bearings 30, 31, supported in the housing 5. The inner end of the propeller shaft 5c is provided with a nut 5x which, through the adjacent coupling element of the coupling 29 and a ring 30a, secures the inner races of the bearings 30 in their seats, whereas a collar 30b surrounding the opening 1f in the adjacent housing end wall (to which the housing 5 is bolted) engages with and secures the outer races of the bearings in their seats. The wall of the opening 1f and ring 30a provide a seat for an oil seal between the housing 1a and propeller shaft 5c.

Operation: as shown in Figs. 1a and 2a, the valve 16e' is in open position to permit fluid flow through the closed circuit and if the motor 1 is in operation, shaft 14 will be driven to drive shafts 15, 15x, whereby the impeller elements 22, 22a, will effect a flow of the fluid (such as oil) through the closed circuit without imparting rotative movement to the controlling unit casing 16a; however, by moving the valve element 16e' to closed position, flow of the fluid through the closed circuit will be arrested, the effect of which is to provide a hydraulic or fluid lock between the impeller element 22 and casing 16a, thereby preventing rotation of the impeller elements 22, 22a; therefore, as the shaft 15 cannot rotate the torque transmitted thereto by the motor shaft 6 is effective to rotate the unit casing 16a at the speed thereof, and the latter in turn, through disk 16', shafts 15', 5c and differential mechanism, will drive the wheels 4. It will be understood that by (a) slowly moving the valve element 16e' to closed position the speed of rotation of the casing 16a will be increased in proportion to the decreasing rate of flow of the fluid in the closed circuit and hence the truck may be started and the speed thereof increased gradually to the maximum speed of the motor 1 or (b) moving the valve element to a selected position (intermediate the open and closed position thereof) the speed of rotation of the casing 16a may be maintained at a substantially uniform rate to drive the truck at a correspondingly desired speed.

The valve 16e' is preferably slidably mounted in the casing 16d' and operated by a manually controlled device, preferably a pedal 32 mounted on a shaft 32x suitably supported on a hanger 32x' depending from the floor A for the driver's station.

Figure 4:
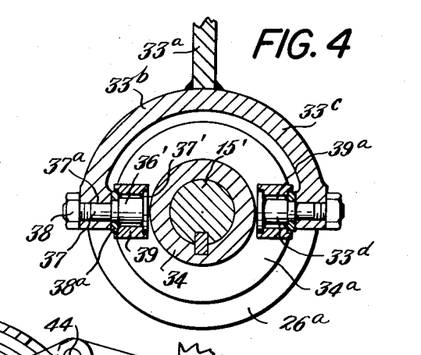
Figure 5:
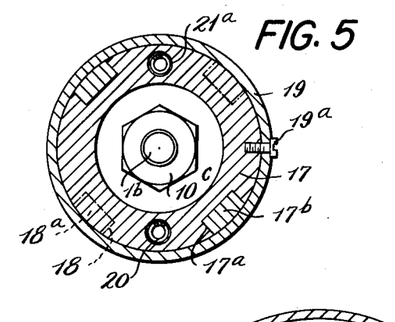
Fig. 5 is a section on the line 5—5 of Fig. 1.

The pedal 32 is connected to a linkage 33, the terminating link 33a of the linkage being provided with a yoke 33b (Fig. 4). The yoke 33b straddles a sleeve 34 rotatably fitting and slidable on and endwise of the shaft 15'. As shown, the sleeve 34 is provided at its outer end with a flange 34a and fixedly secured at its inner end to a plate 35, the outer portion of which is connected to the shank of the valve 16e'. The arms 33c of the yoke 33b are provided with inwardly extending members 33d disposed between the flange 34a and plate 35, and arranged to engage therewith to move the sleeve 34 in either direction. The pedal 32 is biased upwardly by a spring 36 and operates through the linkage to maintain the sleeve 34 in engagement with the collar 15a and the valve 16e' in open position. By operation of the pedal 32 downwardly the sleeve 34 is moved toward the left, as viewed in Figs. 1a and 6, and through the plate 35 operates the valve 16e' to selected positions to vary the speed of the vehicle or to closed position to obtain maximum speed thereof. By preference, the operation of the pedal 32 controls a normally open switch 32a to close and open the circuit 3' for the motor 1; that is, when the pedal 32 is in normal position under the influence of the spring 36 (as shown in Fig. 6), the switch 32a in the circuit 3' is held open, but by operation of pedal 32 downwardly the switch 32a automatically closes the motor circuit, so that the latter will be effective by operation of the lever 3a in either direction to operate the motor 1.

The motor circuit 3' may be traced as follows, starting at switch 32a: lead 200 to negative side of battery 2, lead 200a from positive side of battery 2, switch contact in casing 3, lead 200b, field coil of motor 1, lead 201 to switch contact in casing 3, lead 201a to armature windings of motor 1, and lead 201b to switch 32a; when switch 32a is closed by operation of the pedal 32, the motor 1 can be driven in either direction by operation of lever 3a. When valve 55 is operated by movement of lever 55a to position a, an auxiliary circuit for the motor 1 is traced through lead 300, contacts of switch 301, lead 302 to negative side of battery.

Each of the inturned members 33d of the yoke 33b for operating the valve 16e' comprises a shaft 36' disposed between the flange 34a and plate 35 and a lateral extension 37 mounted in an opening 37a formed in the adjacent yoke arm 33c, the outer end portion of the extension being provided with screw threads engaged by a nut 38, whereby the latter secures the shaft 36' to the adjacent arm 33c. The extension 37 is reduced to provide a shoulder to accommodate a ring 38a between it and the adjacent arm 33c. The ring 38a and a head 37' on the outer end of the shaft 36' engage annular shoulders on the inner side of an annulus 39 mounted on roller bearings 39a between the latter and the shaft 36, whereby the annulus, which engages the flange 34a or plate 35, when the collar 34 is moved endwise, reduces friction between the shaft 36' or the flange 34a or plate 35 according to the direction of movement of the sleeve 34.

Figure 3:
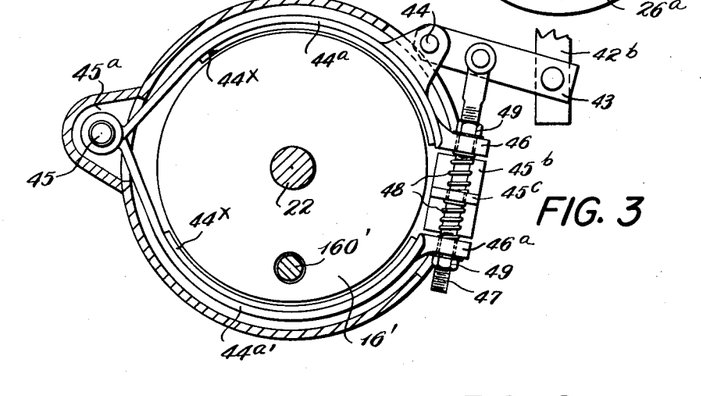

The brake means 25 for the truck preferably comprises a pedal 40 fixed to a rock shaft 41 preferably suitably mounted on a bracket 42 below the flooring A, the shaft 41 in turn being fixed to one end of a link 42a. The opposite end of the link 42a is pivotally connected to the adjacent end of a second link 42b. The opposite end of the second link 42b is pivotally connected to the outer end of a third link 43 (see Fig. 3), the inner end of which is pivotally connected to a lug 44 fixed to the adjacent end portion of a brake shoe 44a. The remote end of the brake shoe 44a and the corresponding end of the other brake shoe 44a' are pivotally mounted on a stud shaft 45 suitably supported on a bracket 45a fixed to the side wall of the housing 1a, with the shoes 44a, 44a', in operative relation to the disk 16'. The outer ends of the brake shoes 44a, 44a', are provided with outwardly extending members 46, 46a, respectively, formed with alined openings in which a rod 47 is loosely slidably mounted, the upper end of the rod 47 being pivotally connected to the link 43 intermediate its ends. Diametrically opposite the bracket 45a and at one side of the members 46, 46a, the housing 1a is provided with a plate 45b. The inner side of the plate 45b is provided with a laterally extending transverse wall 45c disposed substantially midway the members 46, 46a, and formed with an opening alined with the openings in the members 46, 46a, through which the rod 47 extends. The wall 45c provides an abutment for expansion springs 48 each coiled around the rod 47 between the wall 45c and one of the members 46, 46a, for biasing the adjacent brake shoe into brake released position, as shown in Fig. 3. Nuts 49, having screw threaded engagement on the rod 47 on the opposite outer sides of the members 46, 46a, serve to limit the outward movement of the brake shoes 44a, 44a', under the influence of the springs 48. The inner faces of the brake shoes 44a, 44a', are provided with suitable friction material 44x. As shown in Figs. 1a, 3 and 6, the brake shoes 44a, 44a', are disposed in the plane of the brake member 16', already referred to, so that by operation of the brake pedal 40 the shoes will be moved into engagement with the member 16' and thus effect a retardation of or stop the rotation of the fluid controlled unit 16, whereby the driving speed or stoppage of the truck may be controlled by the driver. By preference, the influence of the springs 48 is preferably supplemented by an expansion spring 48a directly connected to the pedal 40.

It will be understood that the fluid controlled unit may be of the multi-piston type or the vane type, as shown in Fig. 2b. Referring to Fig. 2b, 100 indicates a sectional casing having inlet and outlet openings 100a, 100b, respectively, to which the corresponding ends of fluid conduit sections 101, 101a, are connected, respectively, the opposite ends of the conduit sections being connected to the valve casing as shown in Fig. 2a. The casing is formed therewithin with an impeller chamber 102 for an impeller 103, the inner end of the impeller shaft 103a being adapted to be connected to the motor shaft 6 and its outer end being mounted in suitable bearings in the outer end wall of the casing 100, whereas the outer end of the latter is adapted to be connected through a brake disk 16', as already set forth, to the shaft 15' to drive the propeller shaft 5a, as shown in Fig. 1a. The impeller 103 consists of the shaft 103a (above referred to), a hub 104 fixed thereto and formed with inwardly extending spaced slots 104a in which blades 105 are slidably mounted, the outer ends of the blades being arranged to engage with the wall of the chamber 102 during rotation of the shaft 103a. The inlet opening 100a is connected by fluid supply flow channels 106, 106a, to diametrical opposite sides of the impeller chamber 102, whereas the latter, intermediate the outlet ends of the supply channels 106, 106a, is connected with fluid discharge flow channels 107, 107a, leading to the outlet opening 100b. In this form of construction, the opening through the valve casing 16d', conduit sections 101, 101a, channels 106—106a, impeller chamber 102 and channels 107—107a form a closed fluid circuit, through which, with the motor 1 in operation and valve element 16e' in open position, fluid flow in the closed circuit will take place due to rotation of the impeller 103. However, by operation of the valve element 16e' to closed position, the fluid flow in the circuit will be stopped, the effect of which will prevent rotation of the impeller 103, thereby establishing a hydraulic lock between the impeller 103 and casing 100 to rotate the latter at the speed of the motor shaft 6 and transmit power to the driven shaft as already set forth in connection with the construction shown in Figs. 1 to 6, inclusive.

As already set forth, the motor 1 is adapted to be drivingly connected to the rotary pump 9c for a hydraulic system 50, diagrammatically shown in Fig. 6, and capable of moving a device, such as an elevating member (not shown) slidable on guides on the truck chassis. The system 50 consists of a cylinder 50a suitably mounted on a base 50', a piston 50b in the cylinder connected to a cross head 50c, the latter supporting sprockets 51, on which chains 51a reeve to raise the elevating member and the load carrier thereon (not shown). Such raising mechanism may be of any desired form, such—for example—as shown in Letters Patent No. 2,598,566, to Max Lehmann (The Baker-Raulang Company, of Cleveland, Ohio, assignee). Since the shaft 1c, which drives the pump 9c, may be driven in either direction under control of the lever 3a, and clutch member 9a may be connected to its companion clutch element to drive the pump shaft 9b, when the motor 1 is being driven in either direction, the hydraulic system is arranged to supply fluid pressure to the cylinder 50a when the pump 9c is being driven in either direction. 52 is a reservoir for fluid, such as oil, having a supply pipe 52a. The pipe 52a is connected to branch supply pipes 52b, 52b', and the latter pipes are connected by separate pipes 53, 53a, respectively, leading to the liquid flow openings, respectively, for the pump 9c. An auxiliary pipe 54 is connected at its opposite ends to the separate pipes 53, 53a, and intermediate its ends the pipe 54 is connected by a pipe 54a to a suitable valve 55. The valve 55 is connected by a pipe 56 to the intake 56a for the cylinder 50a and by a fluid return pipe 57 to the reservoir 52. The branch supply pipes 52b, 52b', are provided with suitable check valves 58, 58a, respectively, whereas the auxiliary pipe 54 is provided at opposite sides of the pipe 54a with suitable check valves 59, 59a. The valve 55 is operated by the lever 55a, which in one position a controls the supply of fluid under pressure through the pipe 56 to the cylinder intake 56a, whereas in position b the fluid supply is cut off and the fluid in the cylinder 50a, due to gravitation of the piston 50b flows in the reverse direction through pipe 56a, valve 55 and return pipe 57 to the reservoir 52. With the motor 1 running in one direction, the pump 9c will draw fluid from the reservoir 52 through pipes 52a, 52b, 53 and through the adjacent flow opening into the pump chamber and the impeller elements in the pump chamber will force the fluid out of pump chamber through its other opening, pipe 53a, auxiliary pipe 54, and pipe 54a to the valve 55. In circulating the fluid as above set forth, check valve 58a will prevent flow of the fluid under pressure through branch supply pipe 52b' to the reservoir 52 and check valve 59 will prevent flow of the fluid under pressure to the pipes 52b and 53. If the motor 1 is being rotated in the opposite direction, the pump 9c will draw fluid from the reservoir 52 through pipes 52a, 52b', 53a, and through the adjacent flow opening into the pump chamber and the impeller elements in the pump chamber will force the fluid out of the pump chamber through the first referred to flow opening, pipe 53, auxiliary pipe 54, and pipe 54a to the valve 55. In circulating the liquid as just described, check valve 58 will prevent flow of the liquid under pressure through branch supply pipe 52b to the reservoir 52 and check valve 59a will prevent flow of the fluid under pressure to the pipes 52b' and 53a.

From the foregoing description, it will be noted that the fluid system 50 is arranged to supply fluid under pressure, independently of the direction of rotation of the driving shaft for the pump, to a valve, which is operable in the usual manner to direct fluid pressure to the cylinder 50a and direct the fluid from the latter to the reservoir. When the valve lever 55a is in neutral position, pipe 54a is connected through the valve 55 to the return pipe 57 and back flow of liquid in the cylinder 50a and pipe 56 is cut off. In the arrangement disclosed a separate operating motor for the pump is eliminated, as the motor 1 may be employed to supply power for both the traction wheels 4 and the pump 9c, so that the driver is only required to operate valve lever 55a and lever 3a when it is desired to operate the raising mechanism. It will be observed that when the valve 55 is operated to supply fluid pressure to the cylinder 50a, the valve element 16e' is moved to its open position.

The valve 55 is provided with an electric switch 301, which may be enclosed in the valve casing. The switch 301 is preferably connected to the lever 55a, whereby operation of the latter to position a simultaneously closes the circuit 9y to energize the coil 9x and the auxiliary motor circuit, so that in the event the motor 1 is not running, the pump 9c may be driven to supply fluid pressure in the fluid system 50, the closing of the circuit 9y serving to operate the clutch element 9a, as already set forth. Suitable spring means within the casing for the valve 55 are preferably provided to bias the lever 55a from either operated position to neutral position.

The circuit 9y for the solenoid coil 9x is traced as follows, starting at contact 303: switch arm 303', lead 304, coil 9x, lead 302a to positive side of battery 2, lead 302 from negative side of battery to switch arm 303'. When circuit 9y is closed through switch 301, the motor 1 may be driven in either direction by operation of the lever 3a, the motor in turn serving to drive the pump 9c.

Figure 7:
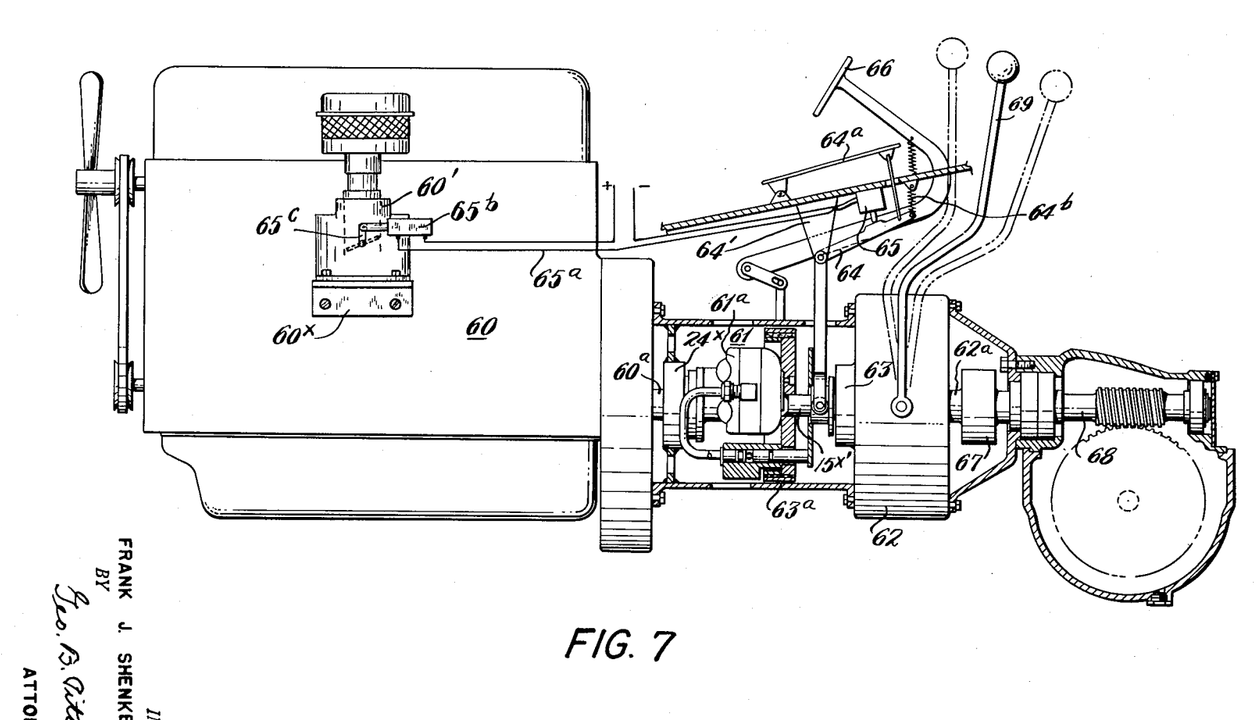
Fig. 7 is a view of the driving mechanism, partly in section, showing a modified form of construction.

Fig. 7 illustrates a modified form of construction wherein the prime motive power consists of an internal combustion engine indicated as an entirety at 60, the crank shaft 60a of which is mounted in suitable bearings (not shown) and drivingly connected to a shaft of a fluid controlled unit 61. The unit 61 is preferably similar to the unit 16 already described. The engine 60 is of conventional construction, the carburetor 60' therefor being mounted on a bracket 60x; other equipment, including the gas supply, ignition system, starter, and wheel brakes and controls therefor not being shown. The shaft, which is alined with the crank shaft 60a, is keyed to the latter and driven thereby, whereas the unit casing 61a is connected to a shaft 15x' similar to the connection for the shaft 15', as shown in Fig. 1a, whereby the shaft 15x', in turn, through a suitable mechanism (enclosed in a casing 62), drives the shaft 62a. The shaft 15x' is mounted in suitable bearings 63. The adjustment for the valve 63a, which controls the rate of flow of the fluid through the controlled unit 61 is connected to a sleeve slidable endwise of the shaft 15x', the sleeve being connected to an arm of and operated by a bell crank 64. The bell crank is fulcrummed at 64' on one side of a bracket 64' fixed to and depending from the floor A' of the vehicle. The other arm of the bell crank is connected by a link to a pedal 64a, the latter being biased upwardly by a spring 64b connected to the adjacent arm of the bell crank 64. 65 indicates a normally open electric switch arranged to close an electric circuit 65a when the pedal 64a is operated downwardly. The circuit 65a is supplied with current from the source of supply 2, shown in Fig. 6 (or a separate source) and connected to the coil of a solenoid 65b, the core thereof being operatively connected to a swingable arm 65c suitably fixed to the butterfly valve of the carburetor 60'. It will be observed from the foregoing description that when the engine 60 is to be driven, the valve 63a for controlling the unit 61 is in open position and the engine 60 is initially started by a conventional starter (not shown); thereafter the pedal 64a is operated to control the carburetor and bring the engine shaft 60a up to operating speed and operate the valve 63a to a selected or closed position. The brake means is similar to like parts shown in Figs. 1a and 6, the operating pedal for the brake means being shown at 66. The pedal 66 is pivotally mounted on the opposite side of the bracket 64' as shown at 66'. The mechanism 62 consists of means for reversing the drive connection between the shaft 15x' and the shaft 62a which, through a coupling 67, is connected to the propeller shaft 68. The coupling 67 is preferably similar in construction to the couplings 12 and 13. The operation of the mechanism to change the direction of rotation of shaft 62a, relative to that of shaft 15x', is operated by a lever 69, the shafts being disconnected when the lever 69 is in neutral position, but in the movement thereof to the right, as viewed in Fig. 7, shaft 62a is driven in the direction to propel the truck in the forward direction, whereas in the movement of the lever 69 to the left of its neutral position, shaft 62a is driven in the direction to propel the truck rearwardly.

Figure 8:
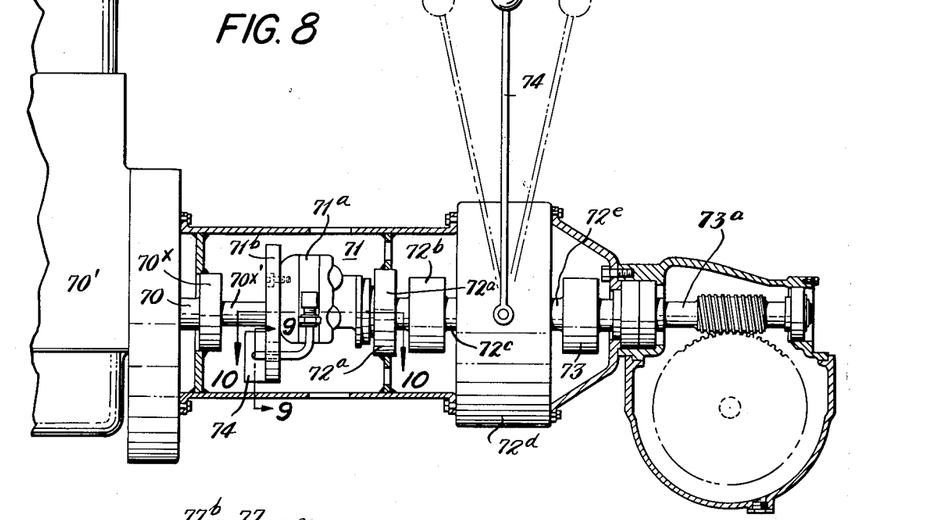
Fig. 8 is a fragmentary elevation similar to parts shown in Fig. 7, but having incorporated therein a different form of control means for the controlling drive mechanism.
Figure 9:
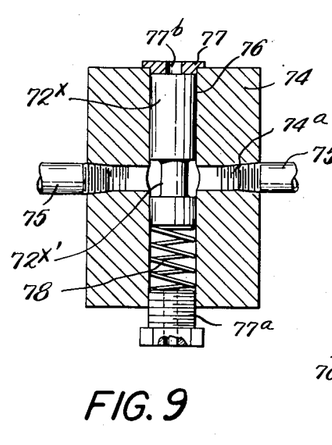
Figs. 9 and 10 are sections on the lines 9—9 and 10—10, respectively, of Fig. 8.
Figure 10:
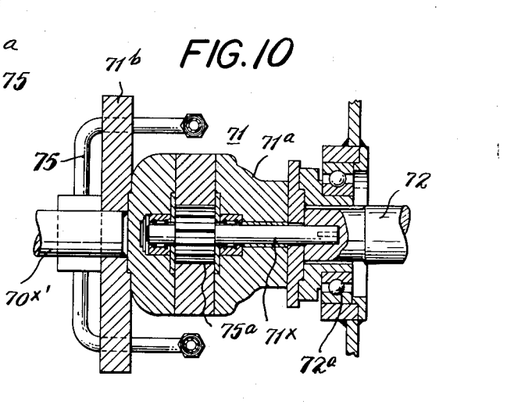

Figs. 8, 9 and 10 illustrate a modified form of construction wherein the shaft 70 driven by the prime motive power 70' (shown for exemplification purposes as consisting of a conventional type of internal combustion engine). The engine 70' is similar in construction to the engine 60 shown in Fig. 7 in having a carburetor, controlled by a pedal, whereby the engine 70' drives the crank shaft 70 at a selected speed. In this form of construction, the crank shaft 70, as later set forth, is connected to and bodily rotates the fluid controlled unit, indicated as an entirety at 71.

The fluid controlled unit 71, in this form of construction, is preferably similar to the fluid controlled unit 16, except that the unit casing 71a is connected through a disk 71b to and driven by the engine shaft 70 and the main or alined shaft 71x of the unit is keyed at its outer end to the adjacent end of the shaft 72, preferably similarly to the connections between the shaft 14 and the adjacent end of the shaft 15 as shown in Fig. 1a, and supported in bearings at its inner end in the adjacent end wall of the casing 71a (see Fig. 10). As a result of such rotation of the unit 71 by the shaft 70, a centrifugal force equal to the square of the velocity of the unit 71 is established and is effective on a movable valve element (Fig. 9, later referred to) to close the flow of fluid to and through the unit, whereby a driving connection is made between the casing 71a and the shaft 72 to drive the truck traction wheels 4 (Fig. 6), as later set forth. The shaft 72 is mounted in suitable bearings 72a and is connected by a coupling 72b to a shaft 72c forming part of a reversing mechanism mounted in a casing 72d, the driven shaft 72c of which mechanism is connected by a coupling 73 to the propeller shaft 73a. The couplings 72b, 73, are preferably similar in construction to each of the couplings 12 and 13. The reversing mechanism in the casing 72d is similar to the reversing mechanism in the casing 62 and operated by a lever 74 similarly to the lever 69. The main shaft 71x and its companion shaft (which is rotatably supported at its opposite ends in the end walls of the casing 71a) are provided with impeller elements, in meshing relation, similar to like parts shown in Fig. 2.

As shown in Fig. 8, the shaft 70 is connected through a coupling 70x to a shaft 70x', the latter in turn being fixed to the disk 71b. The disk 71b in turn supports a housing 74 formed with a through opening 74a through which the fluid flows, the opposite ends of the opening being connected with the conduit sections 75 and forming with the flow chamber 75a in the casing 71a the closed fluid circuit. As will be apparent the opening 74a is disposed parallel to the axis of the shafts 70x' and 71x and intersects at right angles the seat 76 for the slidable valve element 72x therein. The valve seat 76 consists of an elongated recess, preferably a through opening, disposed radially of the axis of the shafts 70x' and 71x and provided at its opposite ends with removable closures 77, 77a, respectively. The closure 77a at the outer end of the opening provides an abutment for the outer end of a compression spring 78, the inner end of which abuts the inner end of the valve element 72x to bias it into engagement with the closure 77 and to resist outward movement of the valve element 72x under the influence of the centrifugal force. As shown, the closure 77a consists of a screw threaded plug the shank of which has screw threaded engagement with the inner wall of the opening 76, whereby the tension of the spring 78 may be increased or decreased. Each closure 77, 77a, is formed with an opening 77b to permit intake and discharge of air from the seat 76 during sliding movements of the valve element 72x. The valve element 72x intermediate its ends is formed with annular recess 72x', which in the normal position of the valve element 72x is alined with the opening 74a to permit fluid flow through the latter.

Operation: With the valve element 72x in normal position, as shown in Fig. 9, and during idling of the engine, the impeller element on the companion shaft in the unit casing 71a revolves around the impeller element on the shaft 71x, the effect of which is to induce fluid flow through the closed circuit. During idling of the engine 70' the generated centrifugal force incident to the rotation of the unit 71 is ineffective to operate the valve element 72x outwardly, but on speeding up the engine, due to operation of the pedal 64a, the valve element 72x will respond to the increased centrifugal force and move outwardly to close off the fluid flow in the circuit in coordinated relation to the engine speed and such reduced flow will retard the revoluble movement of impeller element on the companion shaft of the unit 71 and drive the shaft 72 at a corresponding speed. In the event the engine speed is accelerated to the point where the valve element 72x completely shuts off fluid flow in the circuit, the impeller elements will be in locked relation, so that the speed of the shaft 71x will substantially equal that of the engine shaft and drive the shaft 72 at the same speed. From the foregoing description it will be observed that by controlling the engine speed the shaft 72 may be driven at any desired selected speed.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. A drive mechanism for an operable mechanism having, in combination, a frame, a source of motive power on said frame, a shaft driven by said source of motive power, a separate shaft aligned with said driven shaft and drivingly connected to the operable mechanism, a fluid controlled unit interposed between the adjacent ends of said shafts, said unit including relatively rotatable members, one of which comprises a rotatable unit casing connected to said driven shaft and having therein a chamber, the side walls of said chamber being formed with inlet and outlet openings, and the other of the members comprising a rotatable fluid impeller element in said chamber between said openings fixed to a shaft mounted in the end walls of said chamber in alignment with said driven shaft and said separate shaft and connected at one end to said separate shaft in driving relationship with the latter, a conduit connected at its opposite ends to said openings and providing with said chamber a closed fluid circulation system, and a valve interposed in said conduit between its opposite ends including a valve element arranged to control the flow of fluid through said conduit, said valve element being slidably mounted in a valve casing for movement radially of the axes of said shafts to control the flow of fluid therethrough and actuated automatically by the centrifugal force established by the speed of rotation of said unit casing to vary the flow of the fluid through said conduit to increase or decrease the speed of said separate shaft in response to changes in the speed of said unit casing.

2. A mechanism as claimed in claim 1 wherein a spring is provided in said valve casing to resist outward radial movement of said valve element.

3. A mechanism as claimed in claim 2 wherein means are provided in said valve casing for adjusting the tension of said spring.

4. A drive mechanism for the traction wheels of a vehicle having, in combination, a frame mounted on the vehicle wheels, an electric motor on said frame and having a shaft driven thereby, means for changing the direction of rotation of said motor, a separate shaft alined with said driven shaft and drivingly connected to the traction wheels, a fluid controlled unit interposed between the adjoining ends of said shafts, said unit consisting of a rotatable casing fixed to said separate shaft and having therein a chamber, the side walls of which are formed with inlet and outlet openings, a conduit connected at its opposite ends to said openings and providing with said chamber, a closed fluid circulation system, fluid impeller elements in meshing relation in said chamber between said openings and respectively fixed to parallelly related shafts mounted in the end walls of said chamber, one of said last mentioned shafts being in alinement with said driven shaft and said separate shaft and connected at its inner end to said driven shaft, a valve casing having a through opening interposed in said conduit, a valve in said valve casing for controlling the flow of fluid through said conduit, and means for operating said valve.

5. A mechanism as claimed in claim 2, wherein a brake element is fixed to said unit casing, and a manually operated device is provided for engaging and disengaging said brake element.

6. A drive mechanism for an operable mechanism having, in combination, a frame, a prime motive power on said frame and a shaft driven thereby, a separate shaft alined with said driven shaft and adapted to be drivingly connected to the operable mechanism, a fluid controlled unit interposed between the adjoining ends of said shafts, said unit consisting of a rotatable casing fixed to said separate shaft and having therein a chamber, the side walls of which are formed with inlet and outlet openings, fluid impeller elements in meshing relation in said chamber between said openings respectively fixed to parallelly related shafts mounted in the end walls of said chamber, one of said last mentioned shafts being in alinement with said driven shaft and said separate shaft and connected at its inner end to said driven shaft, conduit sections corresponding ends of which are connected to said openings, a valve casing mounted on said rotatable casing and formed with a through opening the opposite ends of which are connected to the other ends of said conduit sections, said through opening, conduit sections and said chamber forming a closed fluid circuit, and a valve in said valve casing for controlling the flow of fluid through said circuit.

7. In an industrial truck having mounted on the frame thereof a movable member, the combination of a fluid operated mechanism for operating the member, a driving mechanism for the traction wheels of the truck, a motor having a shaft connected at one end to said driving mechanism, and means for changing the direction of rotation of said motor shaft, said fluid operated mechanism including cylinder-piston elements one of which is adapted to be operatively connected to the movable member, a pump having a rotatable impeller connected to the opposite end of said motor shaft and adapted to be driven in either direction thereby, the pump housing having flow openings in operative relation to said impeller, a reservoir for liquid, separate liquid connections between said reservoir and said flow openings, an auxiliary liquid connection connected at its opposite ends to said separate liquid connections, a valve, a liquid supply connection connected at one end to said auxiliary liquid connection between the connection of the latter to said separate liquid connections and connected at its opposite end to said valve, a supply pipe leading from said valve to said cylinder element, a liquid return pipe leading from said valve to said reservoir, a check valve in each first mentioned liquid connection with said auxiliary liquid connection, check valves in said auxiliary liquid connection at opposite sides of said liquid supply connection, and a lever for operating said valve to connect it to said supply pipe or to said return pipe.

8. A truck as claimed in claim 7 wherein the connection between said pump impeller shaft and said motor shaft consists of clutch devices drivingly connected to said pump shaft and said motor shaft, respectively, one of said devices being movable relative to the other device, and means controlled by the movement of said valve lever are provided for operating said movable device in one direction.

9. A mechanism as claimed in claim 6 wherein said prime motive power consists of an internal combustion engine and a carburetor and manually operated means are provided for operating the valve of said carburetor for controlling the speed of the shaft of said engine.

10. A mechanism as claimed in claim 9 wherein a shift mechanism is interposed in said separate shaft for changing the direction of rotation of the traction wheels for the vehicle.

11. A drive mechanism for an operable mechanism having, in combination, a frame, power actuated means on said frame, a first shaft rotatably supported by said frame, a second shaft, means rotatably supporting said second shaft on said frame in alignment with said first shaft, means operatively connecting said power actuated means to one of said shafts to drive the latter upon rotation of said power actuated means, means operatively connecting the other of said shafts to said operable mechanism to operate the latter upon rotation of the shaft connected thereto, a hydraulic unit for interconnecting said shafts including a casing fixed to and rotatable with said first shaft, said casing having a chamber therein and inlet and outlet openings communicating with the said chamber, a hydraulic fluid impeller within said chamber between said openings, means for supporting said impeller coaxially with said second shaft and for connecting said impeller thereto to rotate the impeller upon rotation of the second shaft, conduit means connected at its opposite ends to said openings and forming with said chamber a substantially closed hydraulic fluid circulating system, said system being substantially filled with hydraulic oil-like pressure fluid, valve means in said conduit having a valve element movable between a first position permitting the free passage of fluid through said conduit means and to a second position substantially blocking the flow of fluid through said conduit means, and spring means biasing said valve element to said first position.

12. A mechanism as claimed in claim 11 wherein means are provided for changing the direction of rotation of one of said shafts to drive the mechanism in either direction.

13. A mechanism as claimed in claim 11 wherein the axis of said impeller is alined with the axes of said shafts.

14. A mechanism as claimed in claim 11 wherein said first shaft is connected to said power actuated means and said second shaft is connected to the operable mechanism and the centrifugal force due to rotation of said casing serves to operate said valve element in a direction to move said valve element to its second position to vary the flow of fluid through said circuit in a ratio dependent on the speed of said driven shaft.

15. A drive mechanism for an operable mechanism having, in combination, a frame, a source of motive power on said frame, a first shaft, a second shaft alined with said first shaft, means operatively connecting one of said shafts to said operable mechanism to drive the latter upon rotation of the shaft connected thereto, means operatively connecting the other of said shafts to said source of motive power on said frame for rotation thereby, a hydraulic fluid control unit interposed between the adjacent ends of said shaft, said unit comprising a rotatable casing connected to said first shaft and having therein a chamber, the side walls of said chamber being formed with inlet and outlet openings, rotatable fluid impeller elements in meshing relation in said chamber between said openings, one of said impeller elements being supported for rotation by a shaft mounted in the end walls of said chamber parallel to said first and second shafts, the other of said impeller elements being coaxial with said first and second shafts and operatively connected to said second shaft for rotation thereby upon rotation of the second shaft, a conduit connected at its opposite ends to said openings in the walls of said chamber and providing with said chamber a closed hydraulic fluid circulation system, said system being substantially filled with an oil-like pressure liquid, a valve casing having a through passage interposed in said conduit between its opposite ends, a valve element in said valve casing for regulating the flow of fluid through said conduit to control the rotation of said impeller elements, and spring means normally biasing said valve element to an open position, the valve element being operable to a closed position against the bias of said spring means to form a fluid lock between said second shaft and said rotatable casing.

16. A drive mechanism for an operable mechanism having, in combination, a frame, power actuated means on said frame, a first shaft rotatably supported by said frame, a second shaft rotatably supported by said frame, means operatively connecting said first shaft to said power actuated means for rotation thereby, means operatively connecting said second shaft to the operable mechanism for operating the latter upon rotation of the second shaft, a hydraulic unit for interconnecting said shafts including a casing fixed to and rotatable with said first shaft, said casing having a chamber therein and inlet and outlet openings communicating with said chamber, a hydraulic fluid impeller within said chamber between said openings, means connecting said impeller to said second shaft for rotation therewith, conduit means connected at its opposite ends to said openings and forming with said conduit means a closed hydraulic fluid circulating system, valve means carried by said rotatable casing for controlling the flow of hydraulic fluid through said conduit means, said valve means comprising a valve casing extending generally radially of said rotatable casing and a valve element movable in said valve casing to a first position substantially blocking the flow of hydraulic fluid through said conduit means by the centrifugal force due to the rotation of said casing and to a second position permitting the free flow of hydraulic fluid through said conduit means, and spring means for yieldably urging said valve element to said second position.

17. In an industrial truck, a frame including traction wheels, reversible power means on said frame, drive means for selectively interconnecting said reversible power means and said traction wheels to drive the latter from said power actuated means, a member supported by said frame for movement with respect thereto, a fluid pressure motor for moving said member, a pump, means for connecting said pump to said power actuated means to be driven thereby, said pump comprising a pump chamber having first and second flow openings therein adapted to respectively function as inlet or outlet openings depending upon the direction said pump is driven by said reversible power actuated means, hydraulic fluid connections between said openings and said fluid pressure motor comprising a valve for controlling the flow of pressure fluid to said motor and having a port for receiving pressure fluid from said pump, first conduit means connecting one of said openings to said port, second conduit means connecting the other of said openings to said port, and valve means in each of said conduit means for permitting the flow of pressure fluid from said pump to said valve and operable to prevent the flow of pressure fluid in the reverse direction.

References Cited in the file of this patent

UNITED STATES PATENTS

| | | |
|---|---|---|
| 1,529,061 | Gordon | Mar. 10, 1925 |
| 1,820,855 | Whitehead | Aug. 25, 1931 |
| 1,927,040 | Klimek | Sept. 19, 1933 |
| 1,954,418 | Ley | Apr. 10, 1934 |
| 1,960,705 | Kochling | May 29, 1934 |
| 2,084,219 | Salerni | June 15, 1937 |
| 2,174,344 | Sinderson | Sept. 26, 1939 |
| 2,195,619 | Cumbus et al. | Apr. 2, 1940 |
| 2,242,112 | Chester | May 13, 1941 |
| 2,325,729 | Allin | Aug. 3, 1943 |
| 2,329,594 | Corrigan | Sept. 14, 1943 |
| 2,377,350 | Marsh | June 5, 1945 |
| 2,526,914 | Thomas | Oct. 24, 1950 |
| 2,536,200 | McDonald | Jan. 2, 1951 |